United States Patent [19]

Haag

[11] 4,384,280
[45] May 17, 1983

[54] ANTI-ENTRY DEVICE FOR SURFACES

[76] Inventor: Gunter Haag, Hessenlauweg 10 B, Stuttgart 80, Fed. Rep. of Germany

[21] Appl. No.: 232,264

[22] PCT Filed: Jun. 6, 1980

[86] PCT No.: PCT/DE80/00085
§ 371 Date: Feb. 7, 1981
§ 102(e) Date: Feb. 2, 1981

[30] Foreign Application Priority Data

Jun. 9, 1979 [DE] Fed. Rep. of Germany ....... 2923433

[51] Int. Cl.³ ............................................. G08B 13/18
[52] U.S. Cl. ................................. 340/556; 250/216; 340/550
[58] Field of Search ................ 340/556, 557; 250/216, 250/221

[56] References Cited

U.S. PATENT DOCUMENTS 4,107,522  8/1978  Walter .................................. 250/221
4,239,961 12/1980  Lasar ................................... 340/556
4,310,836  1/1982  Stanzani .............................. 340/556

FOREIGN PATENT DOCUMENTS 2353702  3/1979  Fed. Rep. of Germany .
2379869  9/1978  France .............................. 340/557

Primary Examiner—Glen R. Swann, III

[57] ABSTRACT

An anti-entry device for surfaces in which the edge of the surface to be protected is provided with light-reflecting layers which conduct the light coming from a source of light to a receiver, said receiver being connected to an alarm which is activated when the light to said receiver is disturbed. In order to make the anti-entry device insensitive to adjustment, the light-reflecting layers are formed of elements which reflect an impinging ray of light independently of their angular position, in the plane extending between the layers and parallel to the direction of incidence thereof. These elements are developed as mirror strips which contain 90° angle mirrors or 90° prisms as reflecting elements. Several of such mirrors or prisms can be combined in a single mirror strip.

The anti-entry device is used for the securing of surfaces, such as windows, as well as machines and open-field areas. The anti-entry device is adapted to be portable, particularly for the last-mentioned purpose of use.

11 Claims, 6 Drawing Figures

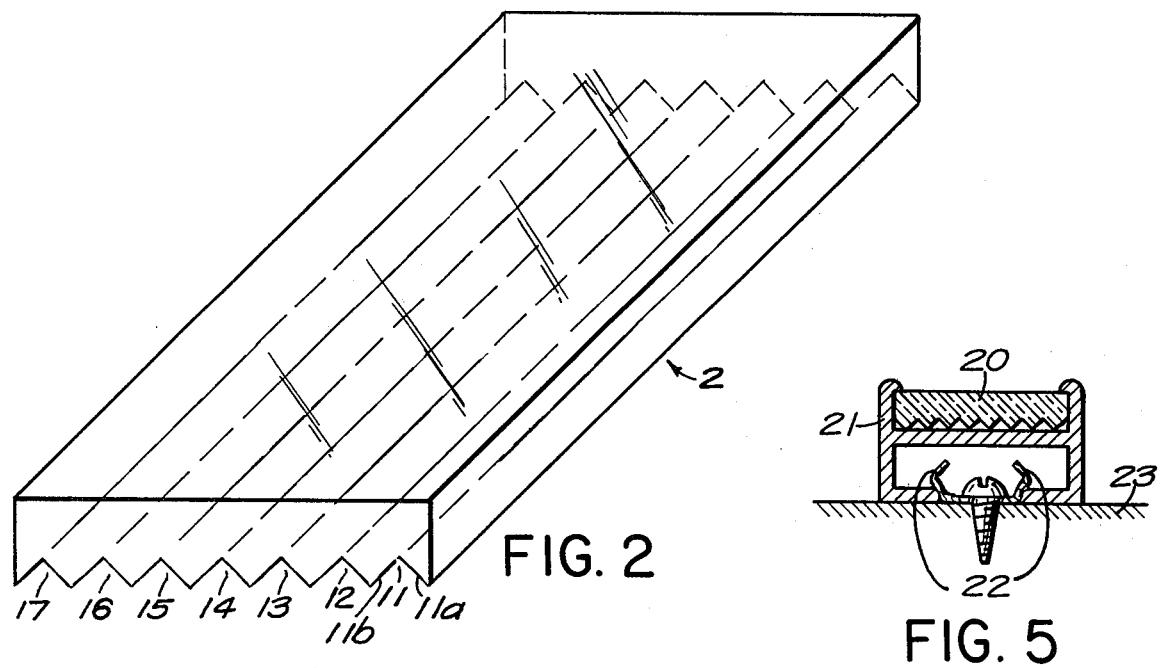
FIG. 2
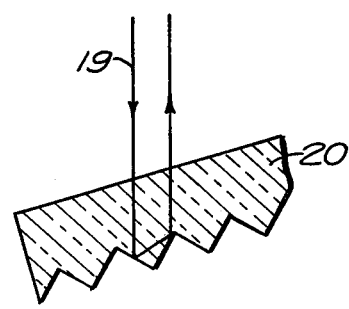
FIG. 5
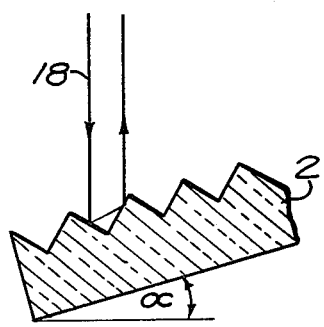
FIG. 3
FIG. 4
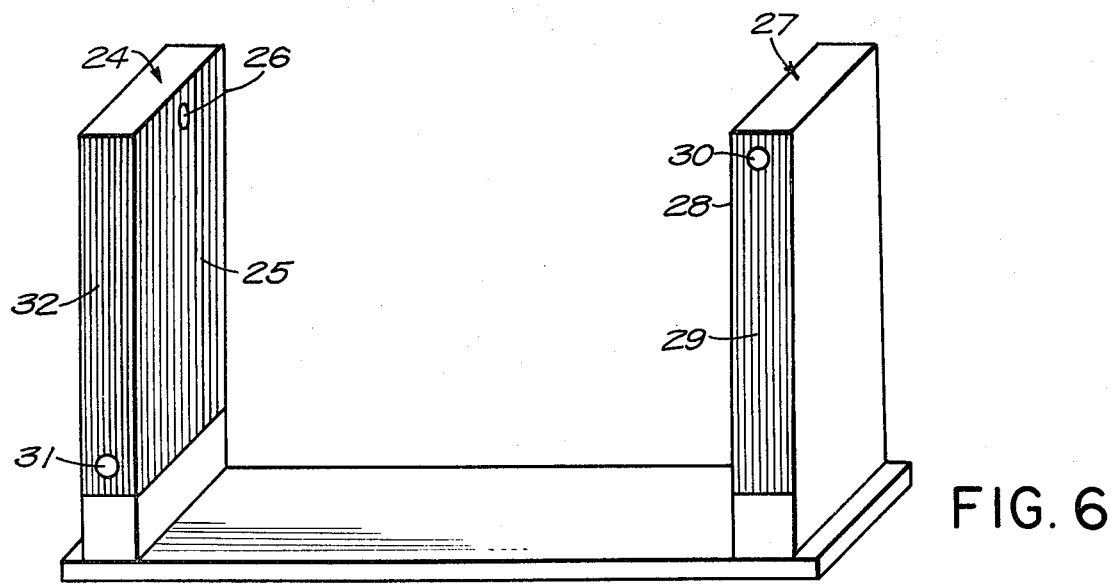
FIG. 6

ANTI-ENTRY DEVICE FOR SURFACES

BACKGROUND OF THE INVENTION

The present invention relates to an anti-entry device for surfaces in which the edge of the surface to be protected is provided with light-reflecting layers which conduct light coming from a source of light to a receiver, said receiver being connected to an alarm which is activated when the light to the receiver is disturbed.

An anti-entry device of the above generally described type is disclosed in West German Patent 23 53 702. The light-reflecting layers in that anti-entry device are disclosed as flat mirror surfaces which are arranged in a sandwich system, for instance between the panes of a window. In this system, the adjustment requirements are minor since the window panes totally reflect light which deviates from the vertical and thus direct it again onto the mirror surfaces.

The expense for adjustment becomes, however, incomparably greater when the anti-entry device is used to secure unglazed surfaces, since the reflected light is reflected by twice the angle of the mirror surface. Therefore even small errors in either the angle between the mirror surfaces or the lateral displacement of the mirror surfaces have a very detrimental effect on the intensity of the light received.

BRIEF SUMMARY OF THE INVENTION

The object of the present invention is to provide an anti-entry device of the above-described type which while being capable of various applications, results in practically no problems in adjustment and is economically produced.

This object is achieved in accordance with the present invention by forming the light-reflecting layers such that they reflect an impinging beam of light, regardless of its angular position in the plane extending between the layers, parallel to its direction of incidence.

In this way any errors in the angle between the light-reflecting elements do not have a detrimental effect on the intensity of the light received and thus on the sensitivity of the anti-entry device. Accordingly the expense for the adjustment of the mounting position of the anti-entry device is kept at a minimum.

It is preferred to form the light-reflecting layers of prismatic elements along opposite edges of the surface to be protected. In order to keep the materials and cost of assembly as low as possible, each light-reflecting layer comprises a mirror strip of optically transparent material, said strip consisting of a plurality of parallel furrows which extend the length of the strip, each furrow having the form of a 90° prism. In this manner a beam of light which penetrates the base surface of a prism is reflected back by the side surfaces in its direction of incidence and parallel thereto, in the plane extending between the strips.

It is also possible to form the light-reflecting layers of 90° angle mirrors. In this case it is advantageous to form the light-reflecting layers of a mirror strip which consists of a plurality of furrows extending parallel to each other and to the longitudinal direction, each furrow forming a 90° angle mirror. Although it is preferred that the mirror strips consist of a material which is highly reflective they may also consist of other materials which are easier to work and less reflective, for instance plastic, the surfaces of which serve for the reflection of the light being mirrored.

In the case of the anti-entry device of the invention, a light-emitting diode operating in the infrared region is preferably used as a source of light. This source of light is modulated. The change in the phase relationship between the entering signal and the received signal can be used to actuate the alarm. It is also possible to use a change in intensity of the received signal in order to activate the alarm.

The present specification is concerned throughout with light which is directed from a source by the light-reflecting layers to a receiver. The expression light is to be understood in this connection as a generic concept for electromagnetic radiation, i.e. electromagnetic radiation of any wavelength.

The anti-entry device of the invention is, of course, also subject to a certain aging process during the course of which the intensity of the received signal declines slowly. In order to counteract this effect and also to be able to distinguish disturbances from that of an alarm an arrangement of components is connected to the light receiver. This arrangement of components integrates the received signal over different periods of time, compares the signals thus obtained and in case of a predetermined deviation activates the alarm.

In order to prevent the mirror strips from being impaired in their action by the depositing of dust, particularly when they are used in the open, they can be arranged vertically.

The anti-entry device of the present invention operates with multiple reflections on the mirror strips, i.e. light is radiated out from the source of light within a predetermined angular range and light is received by the receiver from a comparable angular range. For this purpose lenses, for instance cylindrical lenses which define the corresponding angular range are provided in front of the source of light and in front of the receiver. A curtain of light is formed over the surface to be protected, the disturbance of which from the outside, activates the alarm.

The anti-entry device can be used for the securing of glazed windows or unglazed surfaces.

It is particularly advantageous to apply the mirror strips to portable supports. This makes is possible to establish anti-entry protection of open-field areas rapidly and inexpensively. The areas to be secured can- for instance be within the military field or the field of nuclear reactor safety as well as in prisons.

Another possible application is the securing of machines, i.e. the securing of punches. A machine control can also be provided, as for instance in the counting of workpieces or the rapid disconnection of machines.

Further fields of use are conceivable and possible but will not be discussed in detail herein.

BRIEF DESCRIPTION OF THE DRAWINGS

The invention will be explained in further detail below with reference to FIGS. 1 to 6 of the accompanying drawings in which:

FIG. 2 shows a mirror strip seen in perspective;

FIG. 3 is a section through a 90°-angle mirror strip;

FIG. 4 is a section through a 90°-prism strip;

FIG. 5 is an embodiment for the attachment of a mirror strip;

FIG. 6 is an embodiment for the securing of open terrain.

DETAILED DESCRIPTION OF THE INVENTION

Figure 1:
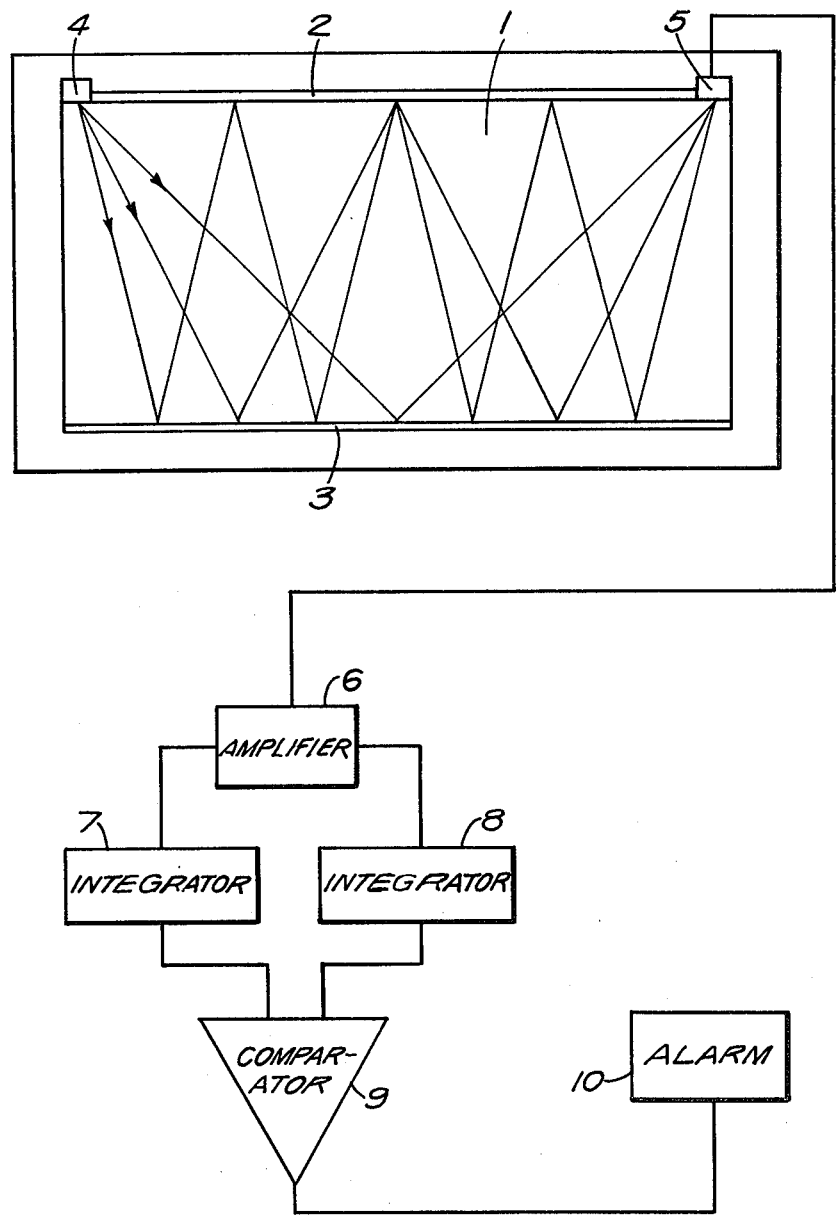
FIG. 1 is a schematic of one embodiment.

In FIG. 1, 1 is a surface to be secured, for instance a window. Along the upper and lower frames there are arranged mirror strips 2 and 3. The light radiated by a source of light 4 within a predetermined angular range, for instance, an infrared-emitting diode, is multiply reflected by strips 2 and 3 and finally reaches a receiver 5.

The distribution of the intensity over the light paths which have been shown by way of example depends on a combination of the absorption properties of the material through which the light passes, the irradiation characteristic of the source of light 4, the coefficient of reflection of the mirror layers 2, 3 and the geometry of the arrangement. The signal obtained from receiver 5 is therefore a summation signal to which the individual rays moving over the different paths contribute.

The signal generated by receiver 5 is fed to an amplifier 6 and from there to two integrators 7 and 8. Integrator 7 integrates the signal over a period of time of about 10 seconds while integrator 8 has a substantially shorter integration time. The two integrated signals are fed to a comparator 9 which compares the signal from integrator 8 with the signal delivered by integrator 7 as reference signal.

In the event of a predetermined difference an alarm is given off by unit 10.

Mirror strips 2 and 3 need not be adjusted very carefully. FIG. 2 shows one such strip 2 in perspective. It consists of a plurality of furrows 11–17 which extend parallel to each other and to the length of the strip. Each individual furrow represents a 90° angle mirror the mirror surfaces of which in the case of the furrow 11 are designated 11a and 11b.

FIG. 3 shows a section through the mirror strip 2, it being assumed that as a result of poor adjustment it forms an angle α with the horizontal. This angle is 0° when the adjustment is proper. A ray of light 18 which extends in the plane between strips 2, 3 extends in the same plane after reflection, merely however it is shifted somewhat parallel to itself.

If the mirror strip of FIG. 2 is made of transparent material and if it is so arranged that its flat rear side faces surface 1 a mirror strip such as shown in cross section in FIG. 4 is obtained. A ray of light 19 penetrates the optically denser medium of strip 20 before it is reflected on the prism surfaces of the 90° prisms. Since the reflection takes place inside an optically denser medium, on a surface facing an optically thinner medium (air), the angle of incidence is greater than the critical angle of total reflection, therefore reflection takes place on the prism surfaces without said surfaces having to be mirrored.

FIG. 5 shows an apparatus for mounting mirror strip 20. Strip 20 is inserted into holder 21 which is connected by spring elements 22 with base 23. In principle a large number of attachments for the mirror strips are conceivable, for instance including attachment by adhesive.

FIG. 6 shows a support 24 whose vertical side surfaces 25 and 32 are provided with mirror strips. Spaced from support 24 is a second support 27 with mirror surfaces 28 and 29. A source of light 26, preferably a laser, produces light which, after reflection on the mirror strips 25, 28 strikes a receiver in support 27 (not visible in the figure). This receiver can also be arranged in support 24. The signal measured by the receiver can be fed to an electronic device of the type shown in FIG. 1 so that an alarm is given off when the curtain of light formed between supports 24, 27 is disturbed.

It is also possible to conduct the light from the receiver in support 27 via optical fibers to a transmitter 30. In front of the plane of the drawing there is then provided another support which has a mirror strip which cooperates with strip 29. If supports of the type shown are arranged at the corner points of a rectangle it is possible simultaneously to secure four planes in which case the alarm is connected with receiver 31 of support 24.

What I claim is:

1. An anti-entry device for surfaces in which a pair of parallel edges of the surface to be protected are provided with light-reflecting layers which conduct the light coming from a source of light to a receiver which is adapted to generate a signal in response to said light and in which an alarm is given off when said light is disturbed, wherein the light-reflecting layers are formed of elements which reflect an impinging ray of light, independently of its angle of incidence, parallel to the direction of incidence thereof in the plane extending between the layers.

2. An anti-entry device according to claim 1, wherein the light-reflecting layers are formed of prism-shaped elements which extend along opposite edges of the surface to be protected.

3. An anti-entry device according to claim 1 or 2, wherein each light-reflecting layer is formed of a mirror strip of optically transparent material said strip consisting of a plurality of furrows extending parallel to each other and to the longitudinal direction of said strip, each of said furrows having the form of a 90° prism.

4. An anti-entry device according to claim 3, wherein the mirror strips are arranged on portable supports.

5. An anti-entry device according to claim 1, wherein the light-reflecting layers are formed of 90° angle mirrors which extend along opposite edges of the surface to be protected.

6. An anti-entry device according to claim 1 or 5, wherein each light-reflecting layer is formed of a mirror strip which consists of a plurality of furrows extending parallel to each other and to the longitudinal direction of said strip, each of said furrows having the shape of a 90° angle mirror.

7. An anti-entry device according to claim 6, wherein the mirror strips are arranged on portable supports.

8. An anti-entry device according to claim 7, wherein said device is used to secure open-field areas.

9. An anti-entry device according to claim 1, wherein connected to the receiver for the reflected light there is an arrangement of components which integrates the signal over different periods of time, compares the signals thus obtained and gives off an alarm in the event of a predetermined difference.

10. An anti-entry device according to claim 1, wherein the light-reflecting layers are along the vertically extending edges of the surface to be protected.

11. An anti-entry device according to claim 1, wherein the use of said device is selected from the group of securing machines, controlling machines and securing open-field areas.

* * * * *